(12) United States Patent
Li et al.

(10) Patent No.: US 9,181,656 B2
(45) Date of Patent: Nov. 10, 2015

(54) FWA FORMULATION USED FOR THE PAPERMAKING PROCESS

(71) Applicants: Meng Jun Li, Surrey (CA); Eric Ji Wei Li, Surrey (CA)

(72) Inventors: Meng Jun Li, Surrey (CA); Eric Ji Wei Li, Surrey (CA)

( * ) Notice: Subject to any disclaimer, the term of this patent is extended or adjusted under 35 U.S.C. 154(b) by 141 days.

(21) Appl. No.: 14/073,856

(22) Filed: Nov. 6, 2013

(65) Prior Publication Data

US 2015/0123037 A1    May 7, 2015

(51) Int. Cl.
*D21H 17/12* (2006.01)
*C09K 11/06* (2006.01)
*D21H 21/30* (2006.01)

(52) U.S. Cl.
CPC ............ *D21H 17/12* (2013.01); *C09K 11/06* (2013.01); *D21H 21/30* (2013.01); *C09K 2211/1085* (2013.01); *C09K 2211/1096* (2013.01)

(58) Field of Classification Search
CPC ....... D21H 17/09; D21H 21/30; C09K 11/06; C09K 2211/1085; C09K 2211/1096
See application file for complete search history.

(56) References Cited

U.S. PATENT DOCUMENTS

| | | | | |
|---|---|---|---|---|
| 5,902,454 | A * | 5/1999 | Nelson | 162/158 |
| 6,030,443 | A * | 2/2000 | Bock et al. | 106/217.5 |
| 7,731,820 | B2 * | 6/2010 | Cockcroft | D21H 17/37 |
| | | | | 162/158 |
| 8,298,373 | B2 * | 10/2012 | Ni et al. | 162/78 |
| 2002/0084049 | A1 * | 7/2002 | Engelhardt et al. | 162/158 |
| 2008/0135805 | A1 * | 6/2008 | Cuesta et al. | C09B 67/0033 |
| | | | | 252/301.25 |
| 2008/0191169 | A1 * | 8/2008 | Rohringer et al. | 252/301.25 |

FOREIGN PATENT DOCUMENTS

| | | | |
|---|---|---|---|
| CA | 2576882 | * | 7/2008 |
| EP | 1881108 | * | 1/2008 |

* cited by examiner

*Primary Examiner* — Carol M Koslow

(57) ABSTRACT

A new fluorescent whitening agent (FWA) formulation containing 0.1%-99.9% fluorescent brightener #351 (FB #351) 4,4"-bis(2-sulfostyryl)biphenyl disodium salt (CAS #27344-41-8) and 0.1%-99.9% fluorescent brightener #71 (FB #71) 4,4'-bis[4-anilino-6-morpholino-1,3,5-triazin-2-yl]amino-2,2'-stilbene disodium salt (CAS #16090-02-1) is used on the wet-end papermaking process and coating papermaking process to increase the brightness of paper.

1 Claim, No Drawings

FWA FORMULATION USED FOR THE PAPERMAKING PROCESS

CROSS-REFERENCE TO RELATED APPLICATIONS

In the following references of related patents, optical brighteners, optical brightening agents (OBA's) and fluorescent whitening agents (FWA's) refer to the same type of specialty chemical. The brightening chemicals present in these patents do not solve the problem brightness gain limit of OBA/FWA as well as the yellowing caused by overdosage. In addition, none of the patents below discuss the use of OBA 351 or/and OBA 71 formulation on the application of wet-end and coating papermaking process.

U.S. Pat. No. 7,812,156 proposes a modified OBA which maintains the high solubility and strong fluorescent whitening effects of previous OBA's while decreases the anionic load that stresses the papermaking system.

U.S. Pat. No. 7,566,349 explores the use of a new FWA of amphoteric bis-triazinylaminostilbene derivative on the process of whitening synthetic or natural organic materials such as paper. This new type of FWA is not usually suppressed in performance when put in the cationic papermaking environment or when combined with residual anionic FWA's.

U.S. Pat. No. 3,790,443 presents a technique of utilizing a water-soluble hydroxymethylaminonitrile salt in the form of dry powder on papermaking materials to quench the fluorescence of optical brightening agents present in the papermaking materials. By adding an acid along with the quencher, some undesirable whitening effects of the OBA's could be neutralized.

US20120211188 discloses the preparation techniques for a specific concentrated aqueous disulfo-stilbene based FWA for optically whitening paper.

U.S. Pat. No. 8,475,630 introduces an aromatic ring based additive that can increase the retention rate of OBA's on paper materials. By using the aromatic ring on the additive to associate with the OBA molecules chemically, capacity for retention is improved.

U.S. Pat. No. 7,789,917 reveals the composition of an amphoteric stilbene OBA, which consists of a substrate and the associated stilbene (one of 4,4'-diamino-2,2'-stilbene disulfonic acid, biarylsulfonate-4,4'-diamino-2,2'-stilbene disulfonic acid, biaryldisulfonate-4,4'-diamino-2,2'-stilbene disulfonic acid, derivatives thereof, salts thereof, and mixtures thereof).

U.S. Pat. No. 7,497,971 describes the use of a mixture of FWA's based on dicyano-1,4-bis-styrylbenzenes and bisbenzoxazoles. Such mixtures of two or more components may exhibit a higher degree of whiteness than that of the sum of the individual components alone.

U.S. Pat. No. 8,262,858 and U.S. Pat. No. 7,914,646 identify the use of oxidative agents for the paper process which enhances the performance of OBA's and chelants. By analyzing various stages of the papermaking process that involve oxidative compositions and processes that preserve and enhance the brightness and improve color of pulp or paper, it was found that the use of an oxidative agent could also reduce the photoyellowing of aged, bleached pulp materials.

U.S. Pat. No. 7,638,016 proposes a method of brightening pulp fibres with at least one stilbene-based OBA after the last bleaching/extraction stage with a chlorine based bleaching agent.

US20120199302 presents a new composition using at least two specific disulfo-stilbene based FWA for optically whitening paper or board.

U.S. Pat. No. 5,064,570 introduces a new preparation method for fluorescent brightener that involves the use of specific water-insoluble aromatic or carbon-substituted fatty alcohol auxiliaries.

EP1253191 presents the composition of detergents, which includes stilbene-triazine-based optical brightener (FB #71).

STATEMENT REGARDING FEDERALLY SPONSORED RESEARCH OR DEVELOPMENT

Not applicable.

REFERENCE TO A SEQUENCE LISTING, A TABLE, OR A COMPUTER PROGRAM

Not applicable.

BACKGROUND OF THE INVENTION

Optical brightening agents (OBA's) or fluorescent whitening agent (FWA's) have chemical properties that absorb light in the ultraviolet region (340-370 nm) and then re-emitting it back into the visible spectrum, usually in the color blue or indigo (420-470 nm). The absorption and re-emission happen at a rapid pace unlike the slow phosphorescence behaviour. The newly added blue light compensates the yellowness of paper products and produces a net whitening effect that is observable to the naked eye.

SUMMARY OF THE INVENTION

One of the biggest hurdles to using conventional FWA is the limit on brightness gain. This is especially prominent in lower brightness paper that has significant mechanical pulp present. As an increasing amount of excess conventional FWA has been input into the system in an attempt to increase the brightness further, the paper materials coming off the machine would have more of a yellow tinge due to the natural appearance of the conventional FWA.

The new generation FB #351 does not encounter this problem as it has a totally different molecular structure which exhibits an almost pure white appearance. There is a plateauing effect for brightness gain associated with injection (at which point the cost effectiveness decreases), but the paper products will no longer have a yellowish tinge. In short, the machine tender can inject as much FWA as needed to increase the brightness to a certain point, without the risking yellowing caused by overdosing. FB #351 re-emits light in the range of 435-440 nm (violet light).

Due to the fact that FW #351 is in a different chemical family, its large number of ethylene bonds allows better interactions with the fibres and hence higher retention rates. This is a totally different case than the conventional FWA, which relies heavily on Van de Waals forces for charge binding. Instead of having a significant amount of conventional FWA left over in the white water system for a prolonged period of time after injection has ceased, a sharp decrease in concentration for the FB #351 in white water can be observed.

FB #71 has been historically used in the detergent industry as a brightener. However its application in papermaking process has not been successful due to the extremely low solubility in water caused by its morpholino functional group. Even though theoretically speaking, it is possible to be used to brighten paper, it was never commercially practical. Therefore FB #71 was not sought after by papermakers.

On the other hand, the low solubility of the FB #71 would yield a significantly higher retention rate on fibers than any other FWA's ever used. By carefully optimizing the dosage in water of various temperatures, dissolution was achieved. FB #71 re-emits light in the range of 440-450 nm (indigo light).

When FB #351 and FB #71 are combined together as a formulation, these two FWA's on low dosage can absorb UV-light on a broader spectrum and re-emit a net brightness higher than that of either FWA's alone at a higher dosage.

When FB #351 and FB #71 are combined together as a formulation, these two FWA's has higher retention than either FWA's alone.

The present invention relates to a novel, low-cost method of producing high final brightness values in paper production not previously achieved, and reducing brightness reversion of paper material.

According to the present invention there is provided a specific FWA formulation for making high brightness paper. The usage of the FWA formulation comprises of approximately 0.01%-1.0% by basis weight of pulp going into the wet-end papermaking process.

The invention provides several advantages over conventional FWA's:
1. Lower cost benefits due to the decreased addition of FWA while still achieving the same, or greater, ISO brightness values.
2. Increased brightness values and retention rates for paper materials over conventional FWA's. This increases the number and variety of applications for the product, significantly expanding its marketability.

The invention and its advantages will be illustrated in more details by the examples below which however, are only intended to illustrate the invention without limiting the same. The percentage and parts stated in the description, claims and examples refer to percent by weight and parts by weight, respectively, unless otherwise stated.

DETAILED DESCRIPTION OF THE INVENTION

The invention will be further described with reference to the following non-limiting examples:

Pulp brightness (ISO brightness) is measured with a brightness meter, which determines the brightness of a split sheet at a wavelength of 457 nm (ISO D65 Standard Method).

The FWA's described in this invention are the following:
1. FB #351 has a chemical name of 4,4"-Bis(2-sulfostyryl) biphenyl disodium salt (100% purity), and a CAS number of 27344-41-8.
2. FB #71 has a chemical name of 4,4'-bis[4-anilino-6-morpholino-1,3,5-triazin-2-yl]amino-2,2'-stilbene disodium salt (100% purity), and a CAS number of 16090-02-1.
3. Disulfo-stilbene based FWA has a chemical name of Disodium 4,4'-bis[(4-anilino-6-hydroxyethylamino-1,3,5-triazin-2-yl)amino]stilbene-2,2'-disulphonate] (100% purity), and a CAS number of 12224-06-5.
4. Tetrasulfo-stilbene based FWA has a chemical name of Tetrasodium 4,4'-bis[[4-[bis(2-hydroxyethyl)amino]-6-(4-sulphonatoanilino)-1,3,5-triazin-2-yl]amino]stilbene-2,2'-disulphonate] (100% purity), and a CAS number of 16470-24-9.

EXAMPLE 1

Laboratory Studies

The incoming samples of 30% Kraft and 70% mechanical pulp mixture for the wet-end papermaking process (from a pulp mill in British Columbia, Canada) with a brightness of 78 ISO and a concentration of 0.7%, was treated with different FWA's at 40° C. and 5 minutes of retention time.

From the results shown in TABLE 1, it is evident that under the same dosage, the new FWA formulation (50% FB #351 and 50% FB #71) can obtain a significantly higher brightness value compared to the conventional FWA's when used on production that requires more mechanical pulp than Kraft pulp.

TABLE 1

| Unbleached ISO Brightness | Disulfo-OBA (%) | Tetrasulfo-OBA (%) | Formulation (%) | ISO Brightness |
|---|---|---|---|---|
| 78 | 0.01 | 0 | 0 | 79 |
| 78 | 0.1 | 0 | 0 | 87 |
| 78 | 1.0 | 0 | 0 | 83 |
| 78 | 0 | 0.01 | 0 | 78.5 |
| 78 | 0 | 0.1 | 0 | 84 |
| 78 | 0 | 1.0 | 0 | 83 |
| 78 | 0 | 0 | 0.01 | 82 |
| 78 | 0 | 0 | 0.1 | 98 |
| 78 | 0 | 0 | 1.0 | 100 |

EXAMPLE 2

Laboratory Studies

The incoming paper samples (from a paper mill in British Columbia, Canada) with a brightness of 84 ISO were coated with coating color and different FWA's.

From the results shown in TABLE 2, it is evident that under the same dosage, the new FWA formulation (0.1% FB #351 and 99.9% FB #71) can obtain a significantly higher brightness compared to the conventional FWA's when used on production that requires coating materials.

TABLE 2

| Uncoated Basesheet Paper ISO Brightness | Tetrasulfo-OBA (%) | Formulation (%) | Coated Paper ISO Brightness |
|---|---|---|---|
| 84 | 0.01 | 0 | 85 |
| 84 | 0.1 | 0 | 90 |
| 84 | 1.0 | 0 | 87 |
| 84 | 0 | 0.01 | 91 |
| 84 | 0 | 0.1 | 107 |
| 84 | 0 | 1.0 | 110 |

EXAMPLE 3

Laboratory Studies

The incoming samples of 100% Kraft pulp for the wet-end papermaking process (from a pulp mill in British Columbia, Canada) with a brightness of 88 ISO and a concentration of 1.0%, was treated with different FWA's at 40° C. and 5 minutes of retention time.

From the results shown in TABLE 3, it is evident that the new FWA formulation (99.9% FB #351 and 0.1% FB #71) can achieve significantly higher brightness when compared to the two conventional FWA's that cause plateauing (and even yellowing) once overdosing occurs.

TABLE 3

| Unbleached ISO Brightness | Disulfo-OBA (%) | Tetrasulfo-OBA (%) | Formulation (%) | ISO Brightness |
|---|---|---|---|---|
| 88 | 0.1 | 0 | 0 | 105 |
| 88 | 0.2 | 0 | 0 | 112 |
| 88 | 0.3 | 0 | 0 | 115 |
| 88 | 0 | 0.1 | 0 | 100 |
| 88 | 0 | 0.2 | 0 | 108 |
| 88 | 0 | 0.3 | 0 | 110 |
| 88 | 0 | 0 | 0.1 | 121 |
| 88 | 0 | 0 | 0.2 | 132 |
| 88 | 0 | 0 | 0.3 | 137 |

What is claimed is:

1. A fluorescent whitening agent (FWA) formulation consisting of 0.1-99.1 weight % for 4,4'-Bis(2-sulfostyryl)biphenyl disodium salt (CAS #27344-41-8) and 99.9-0.1 wt % for 4,4'-bis[4-anilino-6-morpholino-1,3,5-triazin-2-yl]amino-2,2'-stilbene disodium salt (CAS #16090-01-1).

\* \* \* \* \*